United States Patent [19]
Lukas et al.

[11] Patent Number: 5,412,781
[45] Date of Patent: May 2, 1995

[54] METHOD AND ARRANGEMENT OF BUFFER ALLOCATION IN COMMUNICATION SYSTEMS BY EMPLOYING FIXED AND DYNAMIC BUFFER ALLOCATION FUNCTIONS

[75] Inventors: Guenter Lukas, Stockerau; Friedrich Ramberger, Hennersdorf, both of Austria; Siegfried Spahl, Puchheim-Bahnhof, Germany

[73] Assignee: Siemens Aktiengesellschaft, Munich, Germany

[21] Appl. No.: 894,578

[22] Filed: Jun. 5, 1992

[30] Foreign Application Priority Data

Jun. 6, 1991 [DE] Germany .................. 41 18 623.0

[51] Int. Cl.⁶ ............................................. G06F 13/00
[52] U.S. Cl. .............................. 395/250; 364/222.2; 364/239; 364/239.8; 364/239.7; 364/DIG. 1
[58] Field of Search ............ 370/60, 60.1, 85.2, 370/85.6; 395/250, 425, 650, 700, 200

[56] References Cited

U.S. PATENT DOCUMENTS

| | | | |
|---|---|---|---|
| 4,131,762 | 12/1978 | Reid | 179/15 AQ |
| 4,603,382 | 7/1986 | Cole et al. | 395/250 |
| 4,845,710 | 7/1989 | Nakamura et al. | 370/110.1 |
| 5,007,080 | 4/1991 | MacMillan et al. | 379/269 |
| 5,014,265 | 5/1991 | Hahne et al. | 370/60 |

FOREIGN PATENT DOCUMENTS

| | | | |
|---|---|---|---|
| 3407215A1 | 9/1985 | Germany | H04M 3/42 |
| 3629406A1 | 3/1988 | Germany | H04Q 3/545 |
| 37 27 952A1 | 3/1989 | Germany | H04L 11/00 |
| WO 85/00489 | 1/1985 | WIPO | H04M 3/44 |

OTHER PUBLICATIONS

IBM Technical Disclosure Bulletin, vol. 27, No. 3, Aug. 1984, "Flexible Buffer Pooling With An SNA Receiving Station," by T. J. Freund, pp. 1769 and 1770.
ISDN in the Office–HICOM–Technology and Applications of the HICOM ISDN Communication System–Special issue telcom report and Siemens Magazine COM, Dec. 1985–Walter Puls–"HICOM–The First ISDN Communication System For Private Networks", pp. 25–35.
Enzyklopaedie Naturwissenschaft und Technik, Landsberg am Lech, 1980 Verlag Moderne Industrie, p. 3469 (ISBN 3-478-41830-5).
Peter R. Gerke "Rechnergesteuerte Vermittlungssysteme"–Springer–Verlag 1972, p. 184.
Article by M. Doll "Computer Supported Telephony Application–Telekommunikation und DV im Duett", in NTZ, vol. 43 (1990), No. 11, pp. 820–824.
ISDN in the Office–HICOM–Special Issue of telcom report and Siemens Magazine COM–Beckinger et al "Hardware Structure of the HICOM Communication Computer", pp. 56–72.

*Primary Examiner*—Robert L. Richardson
*Attorney, Agent, or Firm*—Hill, Steadman & Simpson

[57] ABSTRACT

Buffer memory systems are utilized in communication systems for the transmission of data that arise irregularly over time. These data are stored in memory areas and are subsequently transmitted block-by-block via a data line. The capacity limit of those memory areas is often exhausted, even though an adequate amount of free memory space is still present in the buffer memory system. A buffer distribution method, which is based on a combination of a fixed and of a dynamic buffer allocation method, solves this problem.

4 Claims, 2 Drawing Sheets

FIG 2

| | | $A_q$ | | | | | |
|---|---|---|---|---|---|---|---|
| | | 1 | 2 | 3 | 4 | 5 | 6 |
| $A_p$ | 1 | 100 | 75 | 67 | 63 | 60 | 59 |
| | 2 | – | 50 | 42 | 38 | 35 | 34 |
| | 3 | – | – | 34 | 30 | 27 | 25 |
| | 4 | – | – | – | 25 | 23 | 21 |
| | 5 | – | – | – | – | 20 | 19 |
| | 6 | – | – | – | – | – | 17 |

METHOD AND ARRANGEMENT OF BUFFER ALLOCATION IN COMMUNICATION SYSTEMS BY EMPLOYING FIXED AND DYNAMIC BUFFER ALLOCATION FUNCTIONS

BACKGROUND OF THE INVENTION

The complexity of communications systems has steadily increased during development processes. This is particularly true because the communication needs as well as the modes of communication of man have fundamentally changed as a consequence of new organizational structures and, consequently, new performance features and services must be implemented in the communication systems. For example, communication systems that are utilized for office communication have thus opened up possibilities for the connected subscribers in recent years to communicate with one another on different levels upon utilization of a multitude of performance features and services. The "VOICE" mode of communication existing up to then thus was expanded by performance features such as "REDIAL", "CALL REROUTING", "ABBREVIATED DIALING", etc., and new services such as "TELEFAX", "VIDEO TRANSMISSION", etc. have been introduced. Offering new performance features and services, however, usually requires an extensive and detailed interplay of the procedure residing in the respective communication systems. With an increasing degree of complexity for the procedures being executed, however, this interplay becomes more and more intractable. Problems thus arise in practice that make a faultless communication between two or more subscribers more difficult. High demands must thus be made of communication systems with respect to their faultless operation. The corresponding parameters have been defined world-wide by international standardization committees—for example, the CCITT—whereby special significance is accorded to the parameter of "probability of failure". These demands made of communication systems, however, thereby generally differ from those that are made of traditional data processing systems. Consequently, the interplay of the procedures of a communication system also occurs fundamentally differently than in a data processing system.

The procedures of the switching technology are accorded special significance insofar as they form the devices for the performance features and services. In order to be able to influence and control this interplay from the outside, data processing systems in the field of office communications are connected to the communication systems employed therein via appropriate connecting lines. Such communication systems employed for office communication purposes are already known from, among others, two articles in the publication "ISDN im Buero", special edition of "Telcom Report" and Siemens-Magazin "COM" of Siemens AG, Berlin and Munich, 1985, (ISBN 3-8009-3846-4); "Hardware-Struktor des HICOM-Kommunikationscomputers", pages 58–66; "HICOM-SOFTWARE von Heute fuer Morgen", pages 67–75, and from German Published Applications DE 37 27 952 A1, DE 34 07 215 A1, all incorporated herein. Furthermore, systems wherein data processing systems are connectable to communication systems of the type set forth above are known from U.S. Pat. No. 5,007,080 as well as from the article by M. Doll "Computer Supported Telephony Application—Telekommunikation und DV im Duett", in NTZ, Vol. 43 (1990), No. 11, pages 820–824, both incorporated herein.

On the one hand, such data processing systems are used as storage systems for specific switching-oriented data of the communication system such as, for example, call charge data, subscriber data, etc. On the other hand, extensive procedures and processes that offer the user possibilities of intervening in the switching-oriented procedures of the communication system run on those data processing systems. It is particularly the presentations in the last-cited prior art that disclose a plurality of examples thereof. Thus, performance features and services can be linked both with one another as well as with external procedures, i.e. procedures running in those connected data processing systems, and can have their operational sequence automated. Such automated operational sequences are generally referred to as applications or functions. The programs that realize an application are deposited on the connected data processing system. The performance features that can be realized by the communication system are stored in the communication system itself and each have a respective external interface. As a result of their modular structure, the performance features can be selected and used by the applications of the data processing system via these interfaces. Thus, for example, the applications can access an electronic telephone book stored in the data processing system and can select the performance feature of "SELECT" in the communication system in accordance with their internal algorithm. Dependent on the respective result (for example, B-subscriber is busy), further subscribers deposited in the electronic telephone book can be selected in an alphabetical sequence upon utilization of this performance feature. The "TELEMARKETING" application or function represents an example of such automated operational sequences. TELEMARKETING represents an especially high-capacity function of marketing support for a customer consultant.

Thus, in the case of an intentional telephone contact by the customer consultant, the respective customers are selected according to a customer list deposited in the connected data processing system, and the telephone contact is set up between consultant and customer. Parallel thereto, specific, customer-associated data such as, for example, address, age, sales in the most recent fiscal year, etc. are displayed via a data display means at the work station of the customer consultant or service representative. When the terminal equipment of the customer, however, is busy, a renewed, automatic dialing by the system occurs at regular chronological intervals. The example of the "TELEMARKETING" function shows the interplay of the procedures of the data processing system with the switching-oriented procedures of the communication system. Information data as well as status data are thus bidirectionally exchanged via the trunks existing between the communication system and the data processing system. The data transmission usually occurs according to an acknowledgement method ("handshaking") universally known in the technology.

What are referred to as buffer memories are generally introduced in these systems, given data transmission problems. These are set forth in detail, for example, in the Enzyklopaedie Naturwissenschaft und Technik, Landsberg am Lech, 1980 Verlag Moderne Industrie, page 3469 (ISBN 3-478-41830-5) or P. R. Gerke, "Rechnergesteuerte Vermittlungssysteme", Berlin-Heidelberg-New York, 1972 (ISBN:3-540-05770-6), page 184, incorporated herein. What are thereby involved are memory systems for the chronological coordination of communication processes. A coordination is particularly required when data arise irregularly, and thus in an unpredictable time span. In this case, those data are collected in a buffer memory and are subsequently transmitted block-by-block via the respective trunk.

One example of irregularly arising data are status data, particularly status data of subscriber terminal equipment. An example of such status data is that the subscriber terminal equipment is a busy, free, initiation of a call request on the part of the subscriber terminal equipment. The status data provide information about the status or about status changes of the subscriber terminal equipment connected to a communication system, and thus arise irregularly in time and potentially in great numbers. For example, they are analyzed and evaluated by the "TELEMARKETING" function. For this purpose, they are transmitted via the trunk to the data processing system since the analysis and evaluation processes of the status data occur on the basis of procedures running thereat. Buffer memories are arranged at the ends of the trunk for the chronological coordination of the transmission processes. The status data arising in a chronologically irregular sequence are collected in the buffer memory and are subsequently transmitted block-by-block via the trunk.

In the prior art, the transmission processes are realized such that memory capacity in the buffer memory—in the form of sub-areas—is permanently allocated to the functions running in the data processing system—such as, for example, the "TELEMARKETING" function—, and the access of those functions to sub-areas of the buffer memory is thus enabled. What is problematical, however, is that those status data must be transmitted in extremely great numbers at times of high traffic load, and consequently the capacity of the sub-areas of the buffer memory is very rapidly exhausted. In this case, procedures of the dependability system must be provided that see to it that the trunk is immediately deactivated since, given overflow, only a part of the status data are transmitted, and thus an incomplete picture of the subscriber terminal equipment would arise in the data processing system. It also turns out that only some sub-areas have rapidly proceeded to their capacity limit in peak load times, whereas others still have adequate storage capacity available.

The abort of a connection is necessarily involved with a loss of all status data. As a consequence, this means that the procedures and functions running on the data processing system no longer have any information about statuses or status changes of the subscriber terminal equipment connected to the communication system.

The status data are usually transferred to an external storage medium so that they are available again at a later time via corresponding loading procedures. In the prior art, the buffer memory is usually dimensioned with a liberally dimensioned reserve in relationship to the arising data sets, an overflow being thus usually avoided. Narrow economical limits, however, are placed on such a liberally designed dimensioning. In practice, this means that even a buffer memory equipped with a reserve can no longer handle the data arising in peak load times and thus has its capacity exhausted—even though correspondingly slower than a buffer memory without reserve. Ultimately, a deactivation of the trunk can also not be avoided here. The outage of the trunk, of course, represents an undesirable limitation of the operating mode of the communication system in terms of its interplay with the data processing system.

SUMMARY OF THE INVENTION

It is an object of the invention to specify a method for a communication system which divides memory capacity present in a buffer memory system arranged therein in such a way that an overflow of the buffer memory system is precluded to a larger degree, or is largely avoided.

According to the invention, a method is provided for buffer allocation in a communication system. The communication system is connected to a data processing system via a trunk line. In the data processing system, applications are run or executed. These applications comprise first applications which require memory locations and a buffer memory system at a defined execution or running time, and second applications that do not require memory location in the buffer memory system at the defined execution time, but at a later execution time. The buffer memory system is provided in the communication system and is connected to the trunk. Data, and particularly status data of the communication system are collected in the buffer memory system. Memory locations in the buffer memory system are allocated via a fixed buffer allocation function to said second applications at said defined execution time. The fixed buffer allocation function assigns first sub-areas of the buffer memory system to the second applications. In combination therewith a dynamic buffer allocation function is provided in combination with the fixed buffer allocation function. This dynamic buffer allocation function assigns second sub-areas of the buffer memory system to said first applications.

What is critical for the invention is a combination of a fixed and of a dynamic buffer allocation method. The fixed buffer allocation method contributes thereto such that each of the functions running or executing in the data processing system has memory capacity in the form of sub-areas in the buffer memory system allocated to it at every point in time. This has the particular advantage that memory capacity is available for every function at all times. The dynamic buffer allocation method contributes thereto such that only the functions running in the data processing system receive memory capacity in the form of sub-areas in the buffer memory system when they in fact require it. The combination of the two buffer allocation methods thereby does justice to the different needs of the respective functions running in the data processing system. The combination can be defined in such a way that the fixed or the dynamic buffer allocation method is differently weighted, dependent upon whether the fixed or the dynamic buffer allocation method should predominate. To what extent the point of view of the currently required memory capacity or the reserve should take effect is also thus taken into consideration.

The combination is particularly formed by the average of the two methods.

The averaging of the two allocation methods occurs in the same way as in the averaging of fixed numbers. The average m thus derives for the two functions $f_1$ and $f_2$, i.e. two functions at $m = \frac{1}{2} \times (f_1 + f_2)$ in this case.

The advantage of such an averaging of the two buffer allocation methods is that an optimum between the dynamic assigning of memory capacity for the functions that require memory capacity at the moment and the reserve for the functions that do not yet require any memory capacity at the moment results.

The invention shall be set forth in greater detail below with reference to an exemplary embodiment shown in the figures, as well as with reference to a table serving the purpose of better understanding.

BRIEF DESCRIPTION OF THE DRAWINGS

FIG. 2 is a table for explaining buffer allocation according to the invention.

DESCRIPTION OF THE PREFERRED EMBODIMENTS

Figure 1:
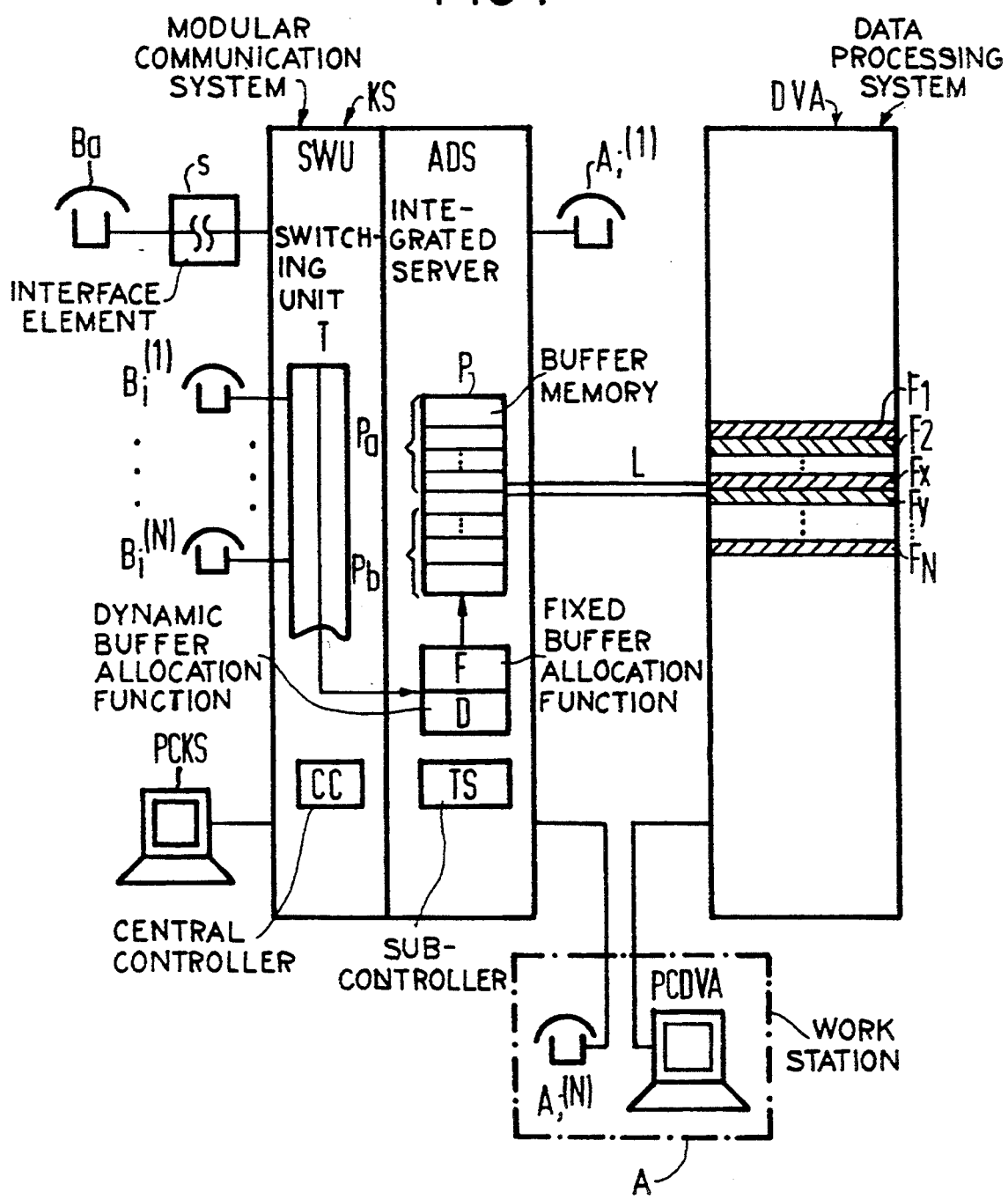
FIG. 1 is a block diagram of a modularly structured communication system KS connected via a trunk L to a data processing system, and wherein a buffering system according to the invention is provided in the communication system.

FIG. 1 shows a modularly structured communication system KS that is connected via a trunk L to a data processing system DVA. Subscriber terminal equipment $B^{(1)}_1 \ldots B^{(N)}_1, A^{(1)}_1 \ldots A^{(N)}_1$ that are employed for internal office communication purposes as well as video display terminals PCKS are connected to the communication system KS. Furthermore, external subscriber terminal equipment Ba are brought in via interface elements S. What are to be particularly understood by external subscriber terminal equipment are the terminal equipment of the public communication networks. The communication system KS is composed of a switching unit SWU as well as of an integrated server ADS. The switching unit SWU comprises a central controller CC, whereas the integrated server ADS is provided with a sub-controller TS that collaborates with the central controller CC. The server ADS is responsible for the editing of the system procedures needed for the operation of the communication system KS. The buffer memory P is located in the integrated server ADS. The trunk L at the output side is connected to the buffer memory P. This trunk L forms the connection to a data processing system DVA. The functions $F_1 \ldots F_x, F_y \ldots F_N$—referred to as applications below—are deposited in the data processing system DVA, the user driving the switching-oriented procedures of the communication system KS therefrom. Video display terminals PCDVA are also connected to the data processing system DVA. Together with at least one subscriber terminal equipment $A^{(N)}_i$ connected to the communication system KS, they form a work station A designed for a customer service representative. An allocation table T is deposited in the switching unit SWU. The applications $F_1 \ldots F_N$ running in the data processing system DVA are allocated to the subscriber terminal equipment $B_i^{(N)}, A_i^{(N)}$, Ba thereat. Which application $F_1 \ldots F_N$ that processes the status data of which of the subscriber terminal equipment $B_1^{(N)}, A_i^{(N)}$, Ba, is thus defined. This allocation is communicated to the buffer allocation procedures F, D deposited in the integrated server ADS via specific transmission procedures.

An active data exchange between communication system KS and data processing system DVA occurs via the trunk L. For this purpose, procedures for the data transmission as well as procedures for further processing of the data formats of the transmitted data are offered in the data processing system DVA. The status data are loaded in the buffer memory P by the subscriber terminal equipment $B_i^{(N)}, A_i^{(N)}$, Ba in an irregular sequence and are transmitted block-by-block into the data processing system DVA by the applications $F_1 \ldots F_N$ via the trunk L. The access of the applications $F_1 \ldots F_N$ to the buffer memories P is controlled via the buffer allocation functions F, D that offer the application $F_1 \ldots F_N$ sub-areas in the buffer memory system P. Thus, the fixed buffer allocation function F allocates the first sub-areas of the buffer memory system P to the second applications $F_1 \ldots F_x$, and the dynamic buffer allocation function D allocates second sub-areas of the buffer memory system P to the first applications $F_y \ldots F_N$.

In order to explain the combination of the fixed buffer allocation method (realized by the fixed buffer allocation function F), and the dynamic buffer allocation method (realized by the dynamic buffer allocation function D), only the fixed buffer allocation function F shall be discussed first. The dynamic buffer allocation function D shall be discussed later.

The memory locations available in the buffer memory P are distributed onto the applications $F_1 \ldots F_x$ by the fixed buffer allocation function F. The applications $F_1 \ldots F_x$ are those applications that do not yet require any memory capacity in the buffer memory system P. This allocation method is mathematically represented by the equation $$P_a = \frac{P_s}{A_a}$$

where:

$P_a$: allocated memory area per application $A_a$ $P_s$: total plurality of memory locations in the buffer memory P, and $A_a$: plurality of applications that do not yet require any memory capacity at time $t_o$ in the buffer memory P, with $A_a = F_1 \ldots F_x$.

Memory areas of the buffer memory P are distributed onto the applications $F_y \ldots F_N$ that require memory space at a specific time $t_o$ by the dynamic buffer allocation function D. This allocation method is mathematically represented by the equation $$P_a = \frac{P_s}{A_p}$$

wherein:

$P_a$: allocated memory area per application $A_p$, $P_s$: total number of memory locations in the buffer memory P, and $A_p$: number of applications that now require memory space in the buffer memory, with $A_p = F_y \ldots F_N$.

A solution that does justice to both demands is comprised, as already mentioned, in the formation of the average of the buffer allocation function F and of the buffer allocation function D. $f_1 = F$ and $f_2 = D$ are thus introduced in the recited equation with the averaging. Deriving therefrom is:

$$P_a = \tfrac{1}{2} \times (F + D)$$

$$P_a = \tfrac{1}{2} \times \left( \frac{P_s}{A_a} + \frac{P_s}{A_p} \right)$$

This relationship is also shown in tabular form in FIG. 2, whereby the number of memory locations ($P_s=100$) recited therein is respectively rounded up. This table was calculated with a total buffer memory capacity $P_s$ of 100 memory locations. Let a few other examples be recited for improved readability of the table:

1. $A_a=1$, $A_p=1$

Only one application ($A_a=1$) is present in the data processing system DVA and this one application ($A_p=1$) requires memory locations. In this case, all 100 memory locations ("second sub-areas") of the buffer memory system P are made available to this application.

2. $A_a=2$, $A_p=1$

Two applications ($A_a=2$) are present in the data processing system DVA. However, only one requires memory locations ($A_p=1$).

The latter application has 75 memory locations ("second sub-areas") of the buffer memory system P made available to it according to the table.

When another application needs memory locations ($A_p=2$), then adequate reserves are present, that is 25 memory locations in the specific instance ("first sub-areas of the buffer memory system P"). This reserve memory location is made available to the second application immediately after it requests a memory location. However, the buffer memory locations B made available are fundamentally recalculated since $A_a=A_p=2$ is now valid. After a defined "response time" in which this calculation is implemented, 50 memory locations of the buffer memory system P are then made available to each application.

3. $A_a=4$, $A_p=2$

At time $t_o$, two applications ($A_p=2$) of four applications ($A_a=4$) present in the data processing system DVa need memory locations in the buffer memory system P; the other two applications do not yet initially need memory locations. According to the table shown in FIG. 2, 38 memory locations are made available to each of the two first applications. At time $t_o+1$, the third application ($A_a=4$, $A_p=3$) requires memory locations. The allocation of the memory locations of the applications, however, thus also changes. As a sequel, 30 memory locations are thus made available to each of the three applications. The allocation of the memory capacity is particularly facilitated when the two first applications have not yet fully exhausted the memory locations allocated to them at time $t_o$. In this case, the capacity that is still free in the memory locations allocated to these can be assigned to the newly added applications. When, however, the capacity of the memory locations—, i.e. 38 in the present case—allocated to the two first applications is fully exhausted (which is still allowable at time $t_o$), then free memory locations cannot yet be assigned to the newly added applications at this time. When, however, the allocated memory locations are not fully exhausted or, on the other hand, the originally fully exhausted memory locations become free after a short time, then this free capacity is allocated to the newly arising applications. Even after a relatively short time span, the status according to the table is thus restored. When, however, the practically irrelevant special case arises that every allocation has fully exhausted the memory location assigned to it, and a further application requires at least that memory location that is its right according to the table, procedures of the dependability systems must see to the abort of the connection between communication system KS and the data processing system DVA.

The method of the invention for buffer distribution thus represents an optimum utilization of the buffer memory system P. Although there is also a residual probability here that the overflow of a memory area allocated to an application will lead to an abort of the connection, this residual probability is far, far lower than in traditional low distribution methods in communication systems, as simulation tests of typical operational sequences in practice have demonstrated.

The capacity limit of the buffer memory P in the method of the invention is reached only in a far, far longer time span than is the case in the prior art. This advantage also appears in the "TELEMARKETING" function whose execution is directly dependent on the processing of the status data of the subscriber terminal equipment $B_i^{(N)} \ldots B_i^{(N)}$, $A_i^{(1)} \ldots A_i^{(N)}$, Ba which is assisted by such a buffer distribution method.

Although various minor changes and modifications might be proposed by those skilled in the art, it will be understood that we wish to include within the claims of the patent warranted hereon all such changes and modifications as reasonably come within our contribution to the art.

We claim as our Invention:

1. A method for buffer allocation in a communication system having a buffer memory system which stores data including irregularly arriving status data, said buffer memory system in said communication system being connected to a data processing system via a trunk line, said data processing system running first applications that require buffer memory locations in said buffer memory system at a defined execution time and running second applications that do not require buffer memory locations in the buffer memory system at said defined execution time but instead at a later execution time, comprising the steps of:
   providing a fixed buffer allocation function for allocating buffer memory locations at first sub-areas in the buffer memory system to said applications; and
   providing a dynamic buffer allocation function in combination with the fixed buffer allocation function for simultaneously allocating buffer memory locations at second sub-areas in the buffer memory system to said first applications.

2. A method according to claim 1 including the step of combining the fixed buffer allocation function and dynamic buffer allocation function by averaging the fixed buffer allocation function and the dynamic buffer allocation function.

3. A communications arrangement, comprising:
   a communication system having a buffer memory system for storing data including irregularly arriving status data;
   a data processing system connected via a trunk line to said buffer memory system for running first applications that require buffer memory locations in said buffer memory system at a defined execution time and for running second applications that do not require buffer memory locations in the buffer memory system at said defined execution time but instead at a later execution time;
   said buffer memory system having connected thereto a fixed buffer allocation function means for allocating buffer memory locations at first sub-areas in the buffer memory system to said second applications; and said buffer memory system also having connected thereto a dynamic buffer allocation function means which in combination with the fixed buffer allocation function means simultaneously allocates buffer memory locations at second sub-areas in the buffer memory system to said first applications.

4. A system according to claim 3 wherein said communication system has subscriber terminal equipment connected thereto.

* * * * *